(12) United States Patent
Burns et al.

(10) Patent No.: US 6,662,135 B1
(45) Date of Patent: Dec. 9, 2003

(54) METHOD AND APPARATUS FOR REFLECTIVE MIXER TESTING OF A CABLE MODEM

(75) Inventors: Lawrence M. Burns, Mountain View, CA (US); Ravi Ramachandran, San Jose, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/207,781

(22) Filed: Dec. 9, 1998

(51) Int. Cl.$^7$ .............................................. G01R 31/00
(52) U.S. Cl. ...................... 702/120; 702/120; 702/57; 702/76; 702/182; 725/107; 725/111; 725/129; 375/222; 375/221; 370/264; 370/252; 370/207
(58) Field of Search ............................. 702/57, 59, 62, 702/81, 120, 122, 182, 183, 185, 189, 188, FOR 103, 104, 134, 170, 171; 725/105, 107, 109, 111, 129, 138; 379/93.31, 93.35, 102.02; 370/264, 207, 252, 241; 375/222, 223; 455/67, 67.7

(56) References Cited

U.S. PATENT DOCUMENTS

| | | | |
|---|---|---|---|
| 4,644,533 A | 2/1987 | Braff et al. | 370/94 |
| 4,881,263 A | 11/1989 | Herbison et al. | 380/21 |
| 4,996,685 A | 2/1991 | Farese et al. | 370/58.1 |
| 5,014,234 A | 5/1991 | Edwards, Jr. | 364/900 |
| 5,138,712 A | 8/1992 | Corbin | 395/700 |
| 5,301,273 A | 4/1994 | Konishi | 395/200 |
| 5,347,304 A | 9/1994 | Moura et al. | 348/12 |
| 5,430,727 A | 7/1995 | Callon | 370/85.13 |
| 5,442,749 A | 8/1995 | Northcutt et al. | 395/200.09 |
| 5,488,412 A | 1/1996 | Majeti et al. | 348/10 |
| 5,489,897 A | 2/1996 | Inoue | 340/870.39 |
| 5,583,931 A | 12/1996 | Schneider et al. | 379/399 |

(List continued on next page.)

OTHER PUBLICATIONS

IBM, Internal Modern Online Test, Apr. 1, 1997, IBM, TDB–ACC–No: NN87044873, pp. 1–5.*

"Cable Modem to Customer Premise Equipment Interface Specification (Interim) SP–CMCI–I02–980317", Multimedia Cable Network Systems (MCNS) Holdings, L.P., Cable Television Laboratories, Inc., 1998, pp. ii to 40.

(List continued on next page.)

Primary Examiner—Marc S. Hoff
Assistant Examiner—Elias Desta
(74) Attorney, Agent, or Firm—McDonnell Boehnen Hultbert & Berghoff

(57) ABSTRACT

A method and apparatus for performing an operability test on a communications system device such as a cable modem is provided. The testing method comprises the steps of providing a set of output test data to the communications system device being tested, and generating an output signal with the device in a manner that is responsive to the output test data. In the case of a cable modem, the output signal is generated by the modem's modulator. The output signal is then provided as an input to a reflective mixer which generates a reflected signal in response to the output signal and directs it back into the communications system device being tested. The communications device can then use the reflected signal to generate a set of input test data that can be compared to the output test data to check the accuracy of the device's operation. In the case of a cable modem, the reflected signal is demodulated by a demodulator at one or more frequencies, and this demodulated data can then be compared to the output test data. In one case, the testing method is controlled by a computer device running a program of instructions to carry out the aforementioned steps. The computer device can send command signals to the modulator and the demodulator to place them in a test mode. Within this mode, the computer device can command the modulator to generate a particular output signal and command the demodulator to demodulate at certain frequencies.

18 Claims, 11 Drawing Sheets

U.S. PATENT DOCUMENTS

| | | | |
|---|---|---|---|
| 5,586,121 A | 12/1996 | Moura et al. | 370/404 |
| 5,598,410 A | 1/1997 | Stone | 370/469 |
| 5,600,717 A | 2/1997 | Schneider et al. | 379/399 |
| 5,606,606 A | 2/1997 | Schneider et al. | 379/399 |
| 5,608,446 A | 3/1997 | Carr et al. | 348/6 |
| 5,610,910 A | 3/1997 | Focsaneanu et al. | 370/351 |
| 5,623,542 A | 4/1997 | Schneider et al. | 379/399 |
| 5,623,601 A | 4/1997 | Vu | 395/187.01 |
| 5,636,211 A | 6/1997 | Newlin | 370/465 |
| 5,675,732 A | 10/1997 | Majeti et al. | 395/200.01 |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | 395/200.54 |
| 5,724,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,974,453 A | 10/1999 | Anderson et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A * | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,065,049 A | 5/2000 | Beser et al. | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,295,554 B1 | 9/2001 | Karadogan | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,442,158 B1 | 8/2002 | Beser | 370/352 |

OTHER PUBLICATIONS

"Operations Support System Specification Baseline Privacy Interface MIB (Interim Specification) SP–OSSI–B-PI–I01–980331", MCNS Holdings, L.P., 1997 and 1998, pp. ii to 33.

"Cable Modem Termination System–Network Side Interface Specification (Interim Specification) SP–CMTS–N-SII01–960702", MCNS Holdings, L.P., 1996, pp. ii to 13.

"Removable Security Module Interface Specification (Interim Specification) SP–RSMI–I01–980204", MCNS Holdings, L.P., Cable Television Laboratories, Inc., 1997, pp. ii to 47.

"Baseline Privacy Interface Specification (Interim) SP-BPI-I01-970922", MCNS Holdings, L.P., 1997, pp. ii to 65.

"Operations Support System Interface Specification (Interim) SP-OSSII01-970403", MCNS Holdings, L.P., 1997, pp. 1 to 30.

"Radio Frequency Interface Specification (Interim Specification) SP-RFI-I02-971008", MCNS Holdings, L.P., 1997, pp. ii to 186.

"Cable Modem Telephony Return Interface Specification (Interim) SP-CMTRI-I01-970804", MCNS Holdings, L.P., Cable Television Laboratories, Inc., 1997, pp. ii to 73.

"Security System Specification (Interim Specification) SP-SSI-I01-970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIB, Internet Engineering Task Force, Internet Draft, "<draft-ietf-ipcdn-tri-mib-00.1txt>," Mar. 1998, pp. 1 to 26.

Kyees, P.J. et al., *ADSL: A New Twisted-Pair Access to the Information Highway,* IEEE Communications Magazine, vol. 33, Issue 4, Apr. 1995, pp. 52–60.

Huang, Yin-Hwa et al., *Design of an MPEG-Based Set-Top Box for Video on Demand Services,* Acoustics, Speech, and Signal Processing, 1995, ICASSP-95., 1995 International Conference, vol. 4, ISBN: 0-7803-2431-5, May 9–12, 1995, pp. 2655–2658.

"A Solution for the Priority Queue Problem of Deadline-Ordered Service Disciplines," N.R. Figueira, IEEE International Conference on Computer Communications and Networks, Sep. 22–25, 1997, pp. 320–325.

"Radio Frequency Interface Specification (Interim Specification) SP-RFI-I05-991105", MCNS Holdings, L.P., 1999, pp. ii to 202.

"Radio Frequency Interface Specification (Interim Specification) SP-RFIv1.1-I06-001215", MCNS Holdings, L.P., 2000, pp. ii to 432.

"Radio Frequency Interface Specification (Interim Specification) SP-RFI-I04-980724", MCNS Holdings, L.P., 1997, pp. ii to 196.

* cited by examiner

ORIGINAL UPSTREAM SIGNAL

UPSTREAM SIGNAL AFTER BEING REFLECTED BY REFLECTIVE MIXER

FIG. 13(a) SHUNT-SHORT TYPE
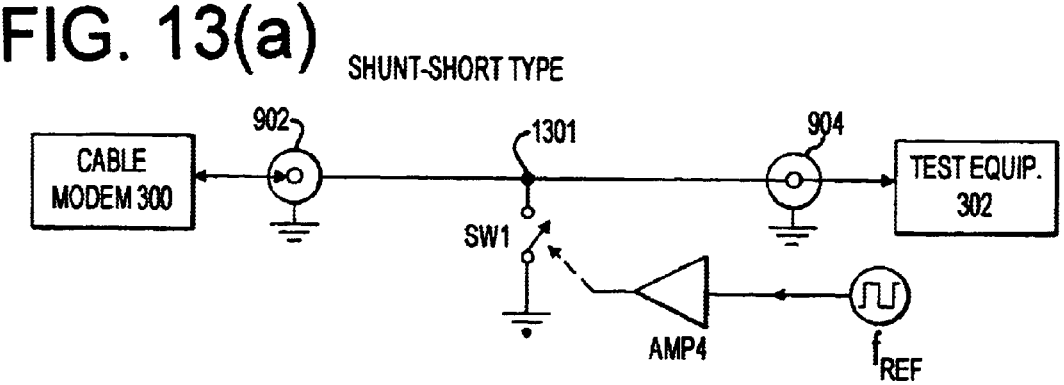
FIG. 13(b) SERIES-OPEN TYPE
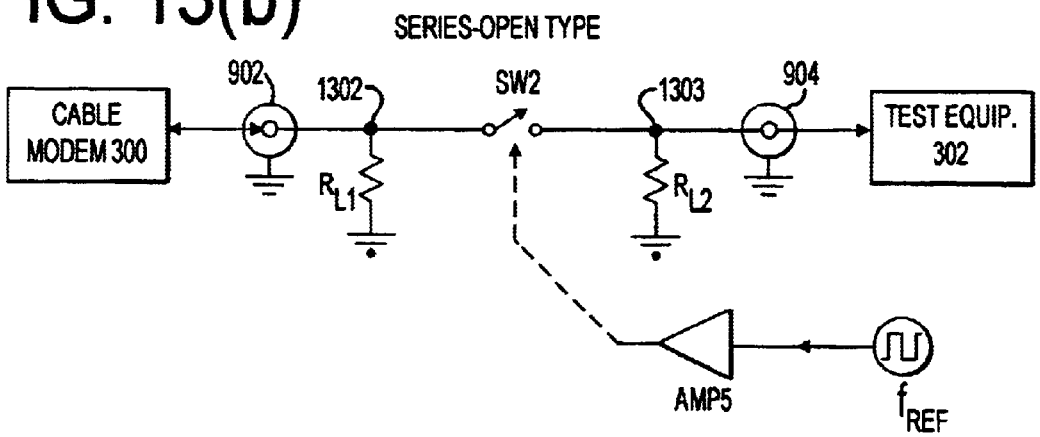
FIG. 13(c) SINGLE-ENDED SHORTING TYPE
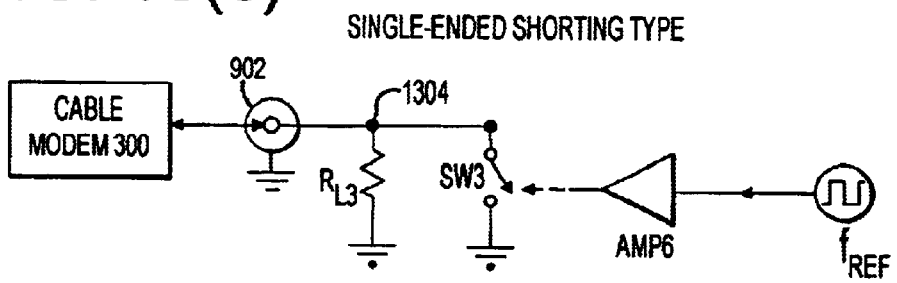
FIG. 13(d) SINGLE-ENDED OPEN TYPE
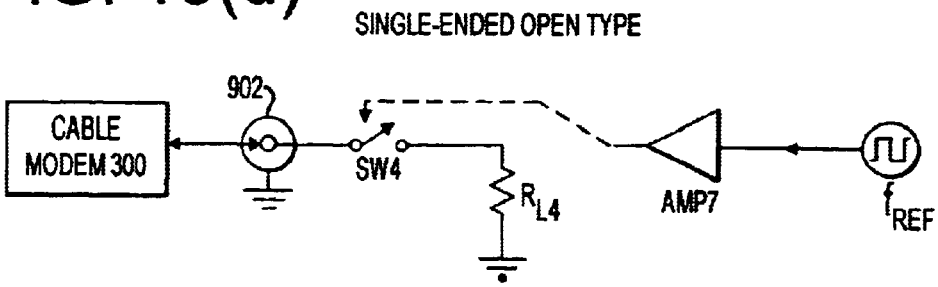

METHOD AND APPARATUS FOR REFLECTIVE MIXER TESTING OF A CABLE MODEM

BACKGROUND OF THE INVENTION

1. Field of the Invention

The present invention relates to communication systems. In particular, the present invention relates to the testing of communications system components such as cable modems.

2. Description of Related Art

As information becomes increasingly more available on communication networks such as a LAN or over the Internet, the development of new methods and apparatus for sending and receiving this information more quickly between communication system users has become an important issue. For instance, one-way and two-way cable modems, both internal and external, based on the Multimedia Cable Network System (MCNS) Data-Over-Cable Interface Specifications (DOCSIS) standard, are currently available to consumers to access data over the Internet at speeds far in excess of those previously attainable by standard analog telephone modems. An external cable modem is a complete, self contained unit which is housed in its own enclosure, separate from a personal computer (PC), as opposed to an internal cable modem which is designed as a peripheral card on a printed circuit board (PCB) inserted into a PC. Two-way cable modems receive modulated data from a head-end (H/E) controller over a 75-ohm coaxial cable (the same cable found in residential housing) and send back upstream data over this same cable to the H/E controller. A one-way cable modem receives data from the H/E on a 75-ohm cable, but transmits upstream data back to the headend using a standard analog telephone modem (i.e. 28/33/56 kbps). In each case the H/E controller exists to serve a number of subscribers to the cable modem service.

Downstream (D/S) data for all subscribers is interleaved in time and continuously transmitted down the cable. The downstream data in one instance occupies a 6 MHz wide channel with a center frequency between 54–850 MHz. Raw D/S data rates may range between 30–40 Mbps. However, most subscribers will see much less than this since the downstream bandwidth needs to be shared with many other subscribers as stated earlier. A typical cable plant installation will have between 500 and 2000 subscribers on a particular downstream channel. In addition, there is some degree of overhead required for header data and forward error correction. This serves to lower the true raw data rate somewhat.

In the case of D/S data, each cable modem continuously monitors the D/S channel. When data addressed to a particular modem is received, the modem takes appropriate action. All other data which is not addressed to that modem is ignored. In the case of the two-way cable modem system, all replies are transmitted on the upstream (U/S) channel of the coaxial cable back to the H/E controller. In one instance of the typical two-way cable modem system, there is no contention (or collisions) on the D/S channel, because no modem ever uses the D/S data channel frequency for U/S data. For, in this instance of the system, the U/S data occupies channels from 200 kHz–3.2 MHz wide in the range of 5–42 MHz. The H/E controller is the single system component which completely decides what data to what modem is sent when on the D/S channel.

However, in the case of the U/S data channel for a two-way system with a number of subscribers there are many cable modems which must compete with each other in some fashion to send their data back to the H/E controller. Of course, if two modems try and send data at the same time to the H/E controller, a collision can occur. Unlike a typical network such as an Ethernet, the individual cable modems can not "hear" (i.e. receive or monitor) data from other cable modems. This is due mostly to the one-way transmission property of the cable plant (due to directive circuit elements, such as power splitters, amplifiers and directional couplers) and also due to the large time delays inherent in the cable plant due to the large distances involved in the cable routing. FIG. 1 shows a diagram of a typical cable plant. The typical cable plant includes a headend controller 100 which is coupled to the rest of the plant via, in one instance, fiber optic cable 110. Data is passed from the headend 100 to the cable modems such as modems 1, 2, 3, 4, N, and N+1, via a network of combiners such as 2-way combiners 115, and 4-way combiners 120. Similarly, in a two-way system, data is passed from the cable modems to the headend 100 over the same network. Additionally, in some existing cable modem plants, the U/S data is split-off from the cable at the fiber 110 junction.

Therefore, it is up to the H/E controller to decide which subscriber modem sends U/S data at what time. In one instance this is done by using a system of mini-slot time increments of around 6.25 use each. Each modem is assigned a time in which it can transmit its signal so as to arrive at the H/E controller in time-interleaved fashion, thereby not colliding with U/S data from other modem subscribers. For all of this to work, the H/E controller performs a ranging operation to determine the time delay from each modem. The H/E controller then figures out for each modem a time slot in which it can send its data so as to not collide with the U/S data from other modems at the H/E controller. The details of this process are complicated and are described more fully in the MCNS DOCSIS specifications referred to earlier.

As can be seen from the above discussion, in order for the overall cable modem based communication system to work properly, especially the two-way cable modem system, each cable modem in the system must be operating properly and according to the MCNS DOCSIS specifications. Thus, in order to ensure a robust cable modem based communication system, it is imperative that each individual cable modem in the system be properly tested to ensure that it is operating correctly.

Currently known methods of testing cable modems, either on the factory floor before home installation, or in the field at the end users installation site, generally make use of bulky, expensive and complicated headend test equipment as illustrated in FIG. 2. A headend unit 205 is coupled to a cable modem 200 which is in turn coupled to a computer 210. The headend 205 is a complex computer controlled apparatus which can be placed in a test mode to send and receive data from a cable modem 200 being tested to analyze the cable modem's performance. Thus, in order to test a number of modems each modem would be brought to and connected to a headend where a series of tests would be run—the modem would then be disconnected and the next modem would go through the same process. Derivations of this headend testing methodology could involve connecting ten or more modems 200 up to the same headend 205 which could sequentially run the testing process on each of the modems.

There are a number of disadvantages with these testing approaches. First, the use of a headend test unit either in the field or on the manufacturing floor is very expensive because of the high cost of the relatively complicated headend test unit. Further, because of the complication of the headend test units, highly skilled test technicians are needed to operate them, even if only a relatively simple test needs to be performed. Finally, the use of a headend test unit takes a large amount of time to setup and perform the test, especially when only a simple functionality test of the unit under test is required. For instance, it is desirable to be able to perform a series of power on self tests which test a number of simple operations of the modem prior to performing any further detailed tests.

Therefore, what is needed is a new method and apparatus which is capable of performing operability tests on a cable modem in a quick, efficient, and cost effective manner which avoids the aforementioned problems of currently known testing methods.

SUMMARY OF THE INVENTION

As discussed above, currently known methods of testing the operability of the RF hardware components of a cable modem can be expensive and complicated, especially when only a simple power on self test is desired. This is because the headend devices used in currently known methods are large and cumbersome devices that are designed for purposes beyond simple testing. Similarly, these devices require a skilled technician to operate. With the above in mind, a method and apparatus for testing a cable modem which is simpler, faster, and more economically efficient than currently known methods is needed.

Accordingly, in one embodiment of the present invention a method of performing an operability test on a communications system device is provided. In this embodiment, a set of output test data is provided, and an output signal is generated in response to this set of output test data with the communications system device. This output signal is provided to a reflective mixer as an input signal, and the reflective mixer generates a reflected signal in response to the output signal. Finally, this reflected signal is provided as a second input signal to the communications system device.

In a further embodiment, the method may also include the steps of generating at least one set of input test data in response to the second input signal and comparing at least one set of input test data with the set of output test data. In this manner the operability of the communications system device can be tested. A further embodiment of this method may include the step of providing an indication of whether the communications system device either passed or failed the operability test.

In one embodiment of the above method steps, the steps of comparing the set of input test data with the set of output test data and providing an indication of whether the communications system device either passed or failed the operability test, are performed by a machine executing a program of instructions tangibly embodied in a program storage device readable by the machine.

In another embodiment of the above method steps the communications system device comprises a cable modem comprising a modulator, a tuner, and a demodulator. In a further characterization of this embodiment, the output signal comprises a modulated signal generated by the modulator, such as a QPSK and a 16-QAM modulated signal. In a still further characterization the output signal comprises a modulated signal at a center frequency from 5 to 42 Megahertz. In a further embodiment, the demodulator generates the at least one set of input test data. Still further, the method may include providing an indication of whether the modulator, the tuner, and/or the demodulator either passed or failed the operability test.

In still another embodiment of the invention, the reflected signal comprises a set of information signals each of which comprise a signal that is essentially the same as the output signal. Further, each information signal is centered about a frequency that is essentially equal to a harmonic of a sample frequency plus or minus the center frequency of the output signal. In one embodiment, the center frequency is from 5–42 Megahertz, and the sample frequency is 100 Megahertz.

This embodiment may be further characterized by the additional method steps of generating a plurality of sets of input test data in response to the second input signal, wherein each of the sets of input test data corresponds to a particular information signal and comparing at least one set of input test data with the set of output test data. Still further, this embodiment of the method may also include the steps of comparing at least one set of input test data to at least one other set of input test data, and providing an indication of whether the communications system device either passed or failed the operability test.

Still further, this embodiment may be defined in that the steps of comparing the plurality of sets of input test data with the set of output test data, comparing at least one set of input test data to at least one other set of input test data, and providing an indication of whether the communications system device either passed or failed the operability test may be performed by a machine executing a program of instructions tangibly embodied in a program storage device readable by the machine. The step of generating a plurality of sets of input test data in response to the second input signal may be performed by the demodulator in response to command signals generated by the machine executing the program of instructions. Similarly, the step of providing a set of output test data may also be performed by the modulator in response to command signals generated by the machine executing the program of instructions.

In still another embodiment of the method, the method may include the steps of coupling a spectrum analyzer to the reflective mixer; and analyzing the output signal with the spectrum analyzer.

The present invention, as summarized above with respect to method steps, may be alternatively characterized as a communications system testing apparatus. The testing apparatus includes, in one embodiment, a communications system device comprising a transmitter and a receiver, an output node electrically coupled to the transmitter, wherein the output node receives an output signal generated by the transmitter in response to a set of output test data, and a reflective mixer electrically coupled to the output node, wherein the reflective mixer generates a reflected signal in response to the output signal. Also provided is an input node electrically coupled to the reflective mixer and to the receiver, wherein the input node receives the reflected signal, and a test control device, electrically coupled to the communications system device and configured to control a test mode of the communications system device such that in the test mode the transmitter generates the set of output test data in response to command signals generated by the test control device.

In a further characterization of this embodiment, the receiver generates at least one set of input test data in response to the reflected signal, which in a further embodiment is generated in response to command signals generated by the test control device. In a still further embodiment, the test control device performs a test of the operability of the communications system device by comparing the at least one set of input test data with the set of output test data. In one instance, the test control device generates an indication of whether the communications system device either passed or failed the operability test.

In one embodiment of the invention the communications system device comprises a cable modem. In this instance, the transmitter comprises a modulator and the receiver comprises a demodulator. The output signal, in this instance, may comprise a QPSK or a 16-QAM modulated signal with a center frequency from 5 to 42 Megahertz.

In one characterization of the above embodiment, the receiver generates the at least one set of input test data in response to command signals generated by the test control device, and the test control device performs a test of the operability of the communications system device by comparing at least one set of input test data with the set of output test data.

In another embodiment of the apparatus the reflected signal comprises a set of information signals each of which comprise a signal that is essentially the same as the output signal. Each information signal is centered about a frequency that is essentially equal to a harmonic of a sample frequency plus or minus the center frequency of the output signal. In one instance, the center frequency is from 5–42 Megahertz, and the sample frequency is 100 Megahertz.

In one instance of this embodiment, the receiver generates a plurality of sets of input test data in response to the reflected signal, wherein each of the sets of input test data corresponds to a particular information signal. In one case, the receiver generates the plurality of sets of input test data in response to command signals generated by the test control device. In another case, the test control device performs a test of the operability of the communications system device by comparing at least one set of the plurality of sets of input test data with the set of output test data. In still another case, the test control device performs a test of the operability of the communications system device by comparing at least one set of the plurality of sets of input test data with at least one other set of input test data.

In another embodiment, the apparatus also includes a spectrum analyzer electrically coupled to the reflective mixer such that the output signal can be analyzed by the spectrum analyzer. In still another embodiment, the test control circuit comprises a machine executing a program of instructions tangibly embodied in a program storage device readable by the machine.

Lastly, in another embodiment of the invention, the reflective mixer includes a signal generator which generates a switching signal at a sample frequency and a variable impedance device configured to adjust one of the phase and amplitude of the reflected signal in response to the switching signal. In alternate embodiments, the switching signal may comprise one of a train of pulses and an overdriven sine wave at a sample frequency of 100 Megahertz. In one embodiment the variable impedance device comprises an FET transistor wherein the switching signal is provided to the gate of the FET transistor.

A BRIEF DESCRIPTION OF THE FIGURES

The figures illustrate the invention by way of example, and not limitation. Like references indicate similar elements.

Figure 5A:
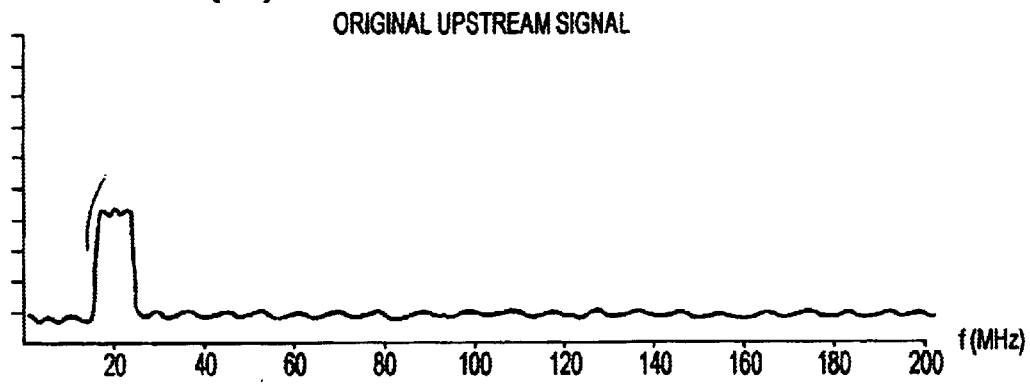
Figure 5B:
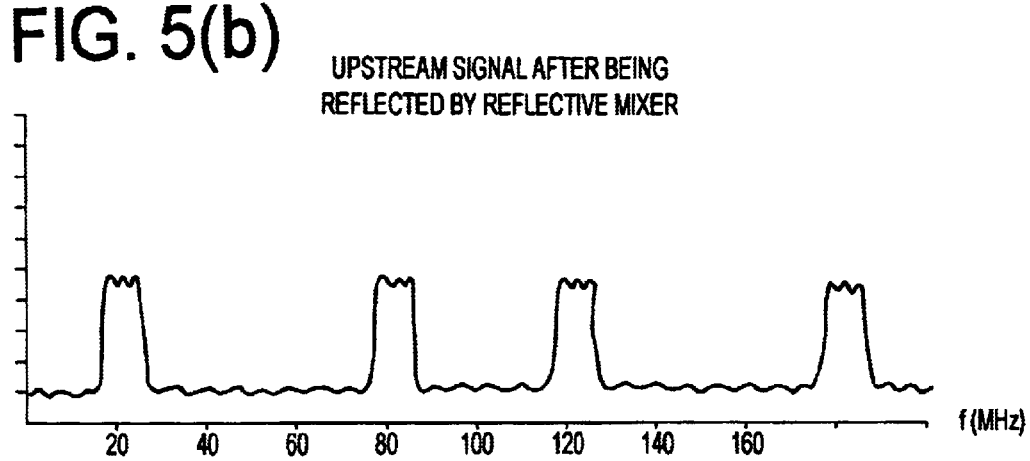

FIGS. 5(a)–(b) illustrate an original upstream signal as it would appear on the output of a typical cable modem, and the upstream signal after being reflected by a reflective mixer.

Figure 6:
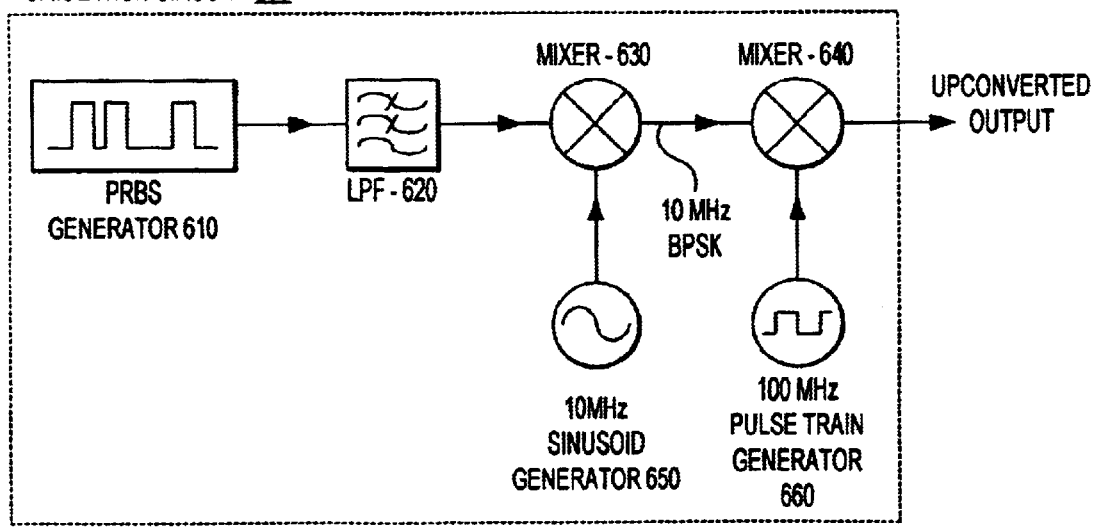

FIG. 6 is a block diagram illustrating a circuit that can be used to simulate the action of a reflective mixer attached to a cable modem.

Figure 7:
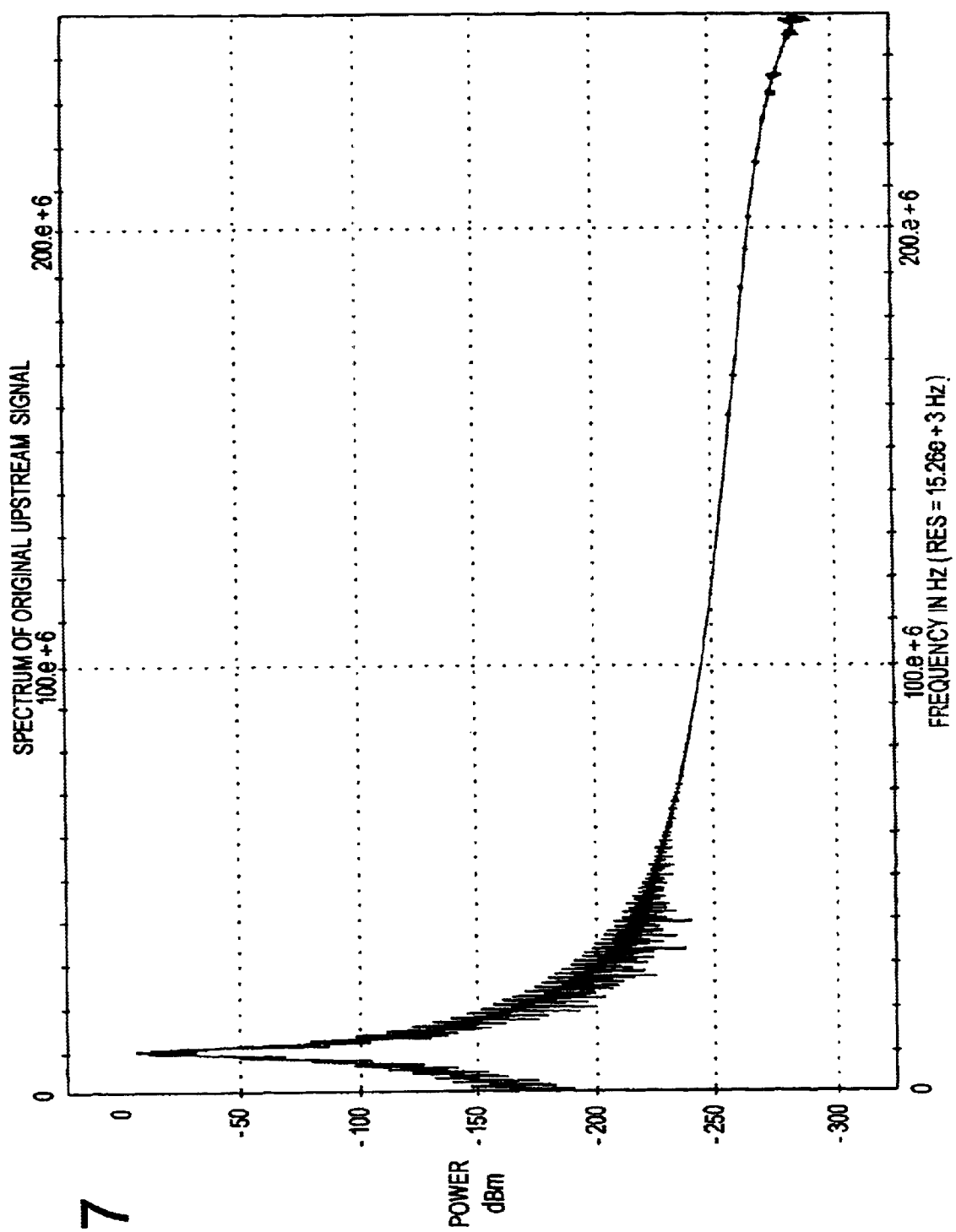

FIG. 7 illustrates the frequency spectrum of an original upstream signal at 10 MHz.

Figure 8:
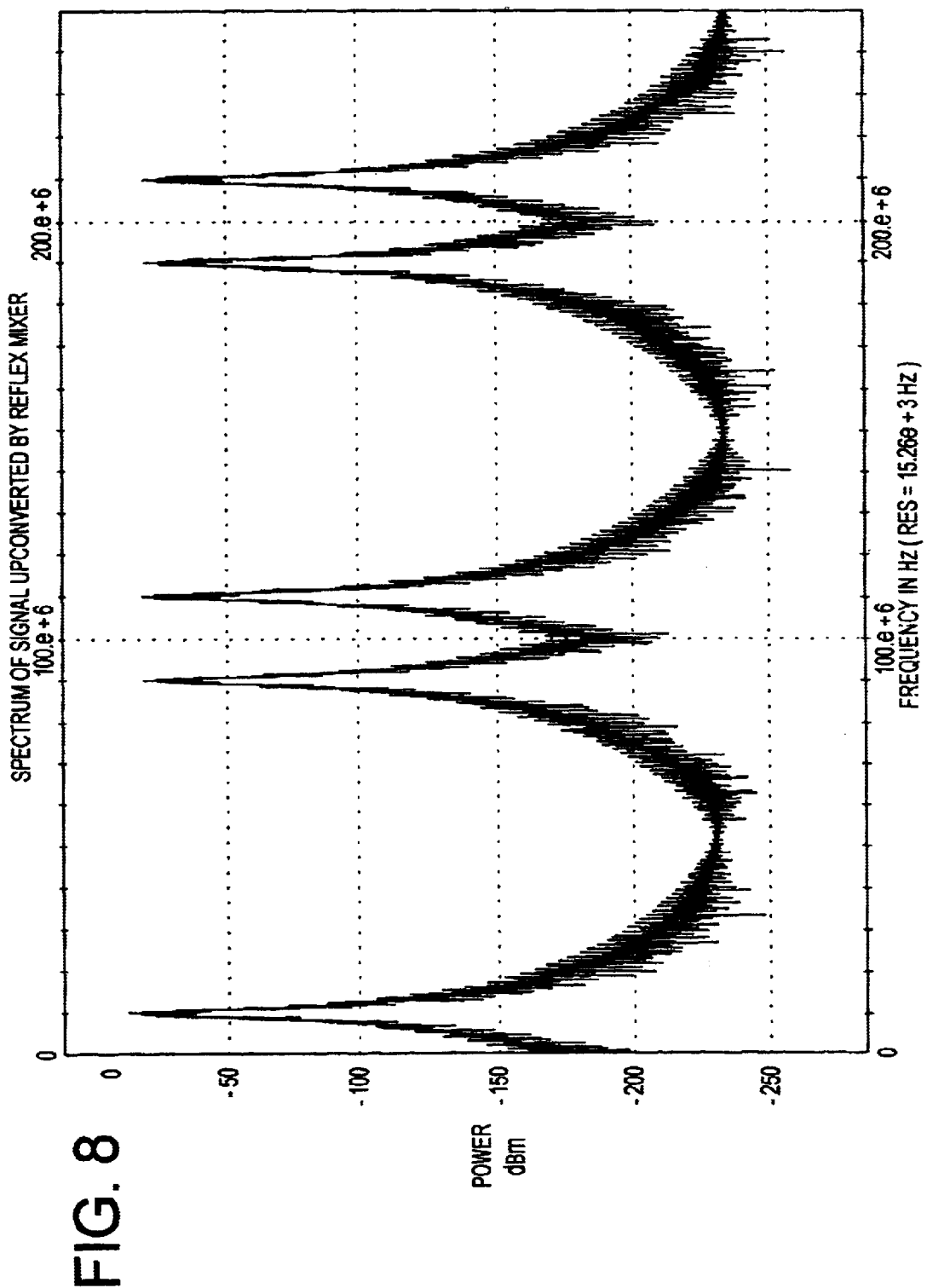

FIG. 8 illustrates how the simulated reflective mixer of FIG. 6 provides replicas of the original 10 MHz upstream signal of FIG. 7.

Figure 9:
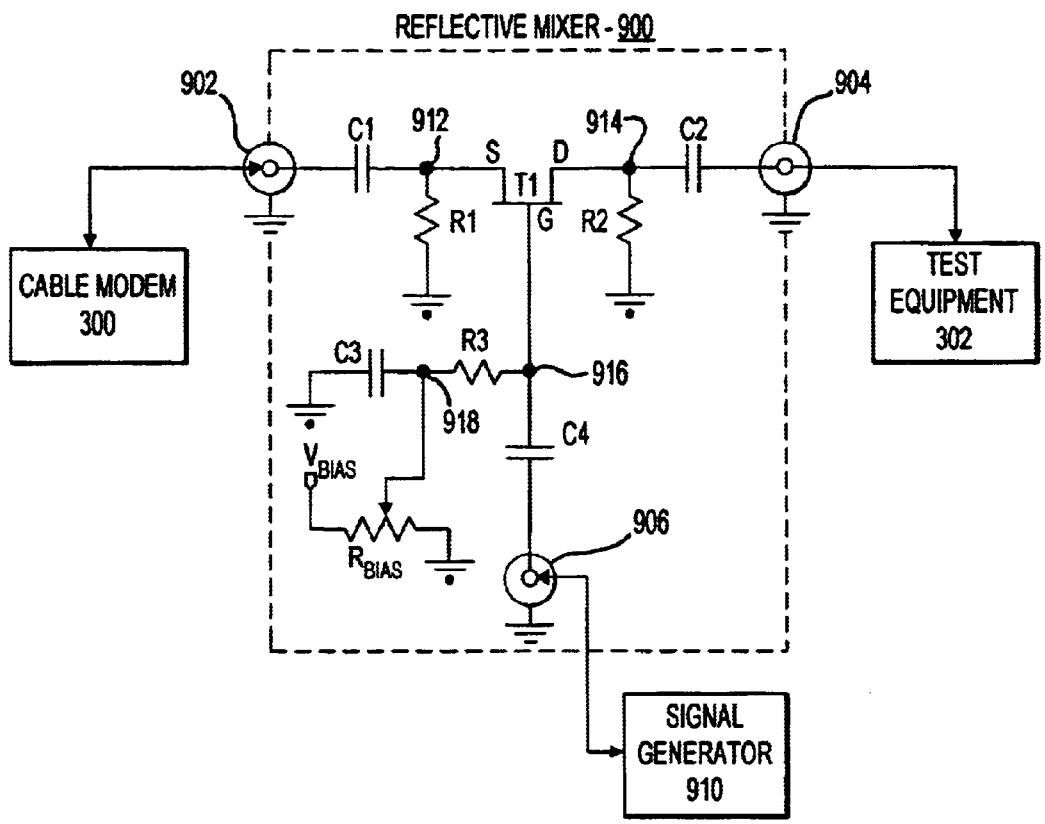

FIG. 9 illustrates a detailed circuit schematic of one embodiment of a reflective mixer.

Figure 10:
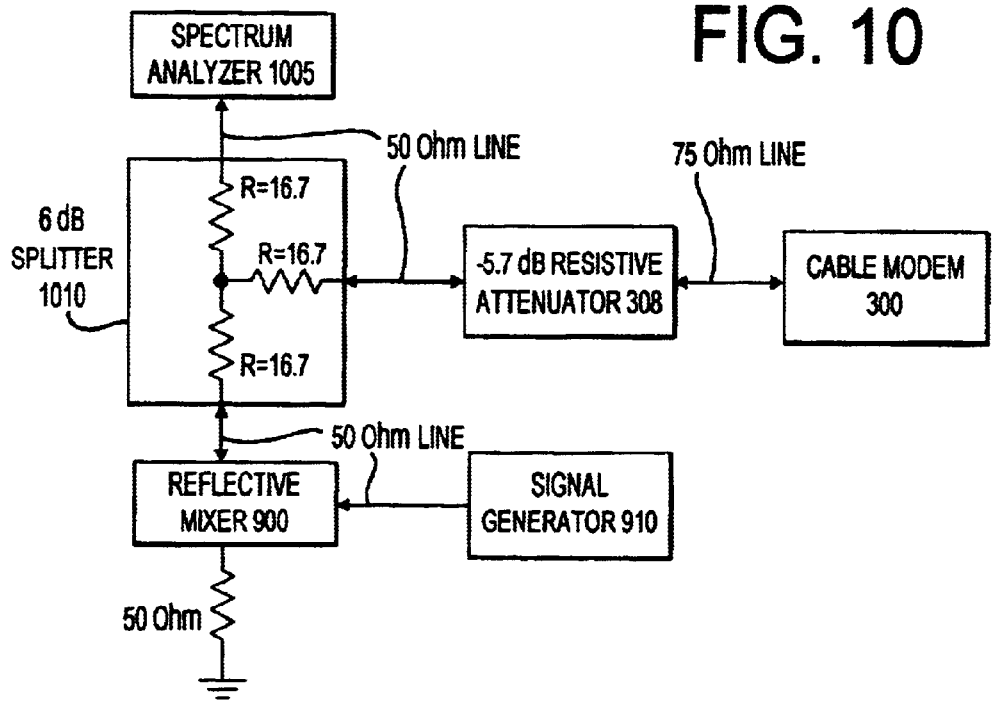

FIG. 10 illustrates a block diagram of a test set-up that was utilized to illustrate the action of the reflective mixer circuit of FIG. 9.

Figure 11A:
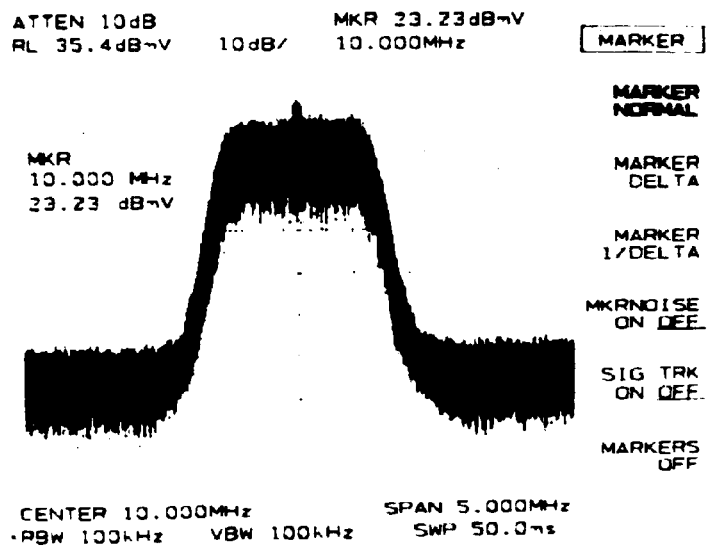
Figure 11B:
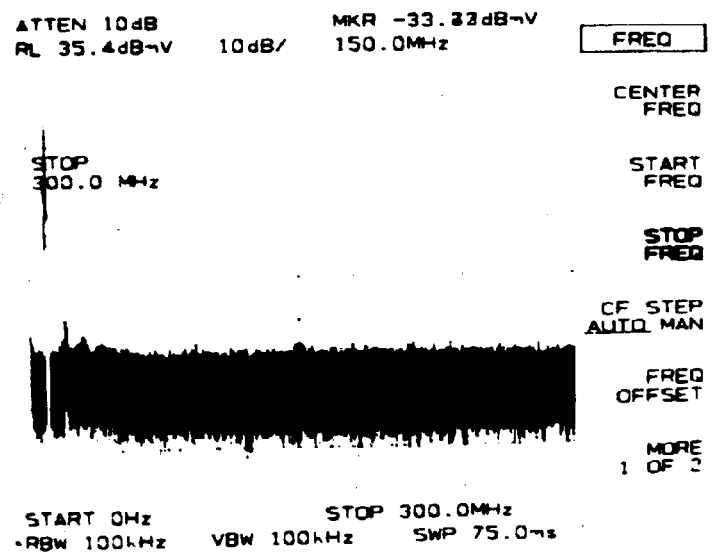

FIGS. 11(a)–(b) illustrate the broad and narrow band spectra of an original upstream signal from a cable modem being tested using the set-up of FIG. 10.

Figure 12A:
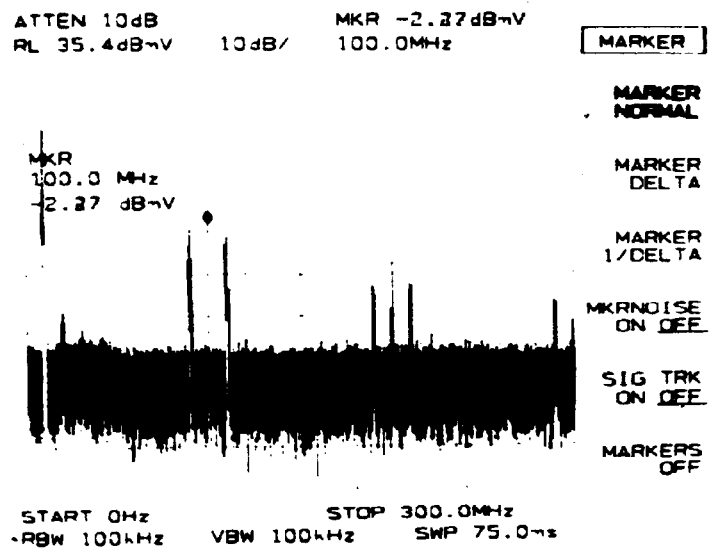
Figure 12B:
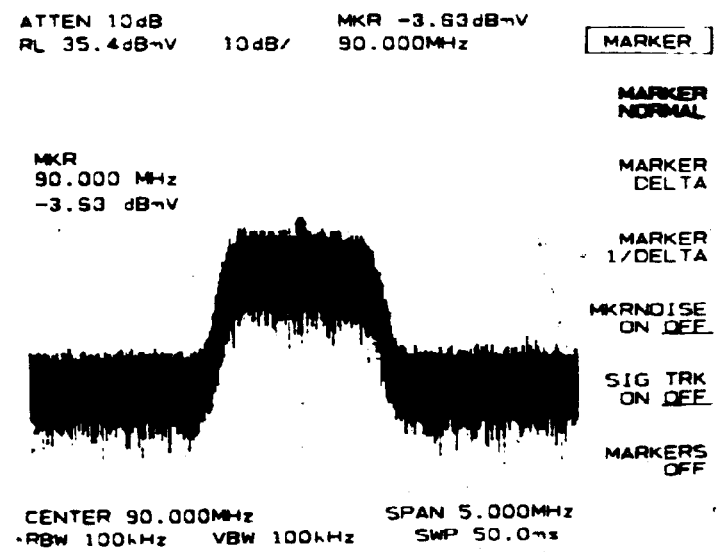

FIGS. 12(a)–(b) illustrate the broad and narrow band spectra of a reflected signal from a cable modem being tested using the set-up of FIG. 10.

Figure 1:
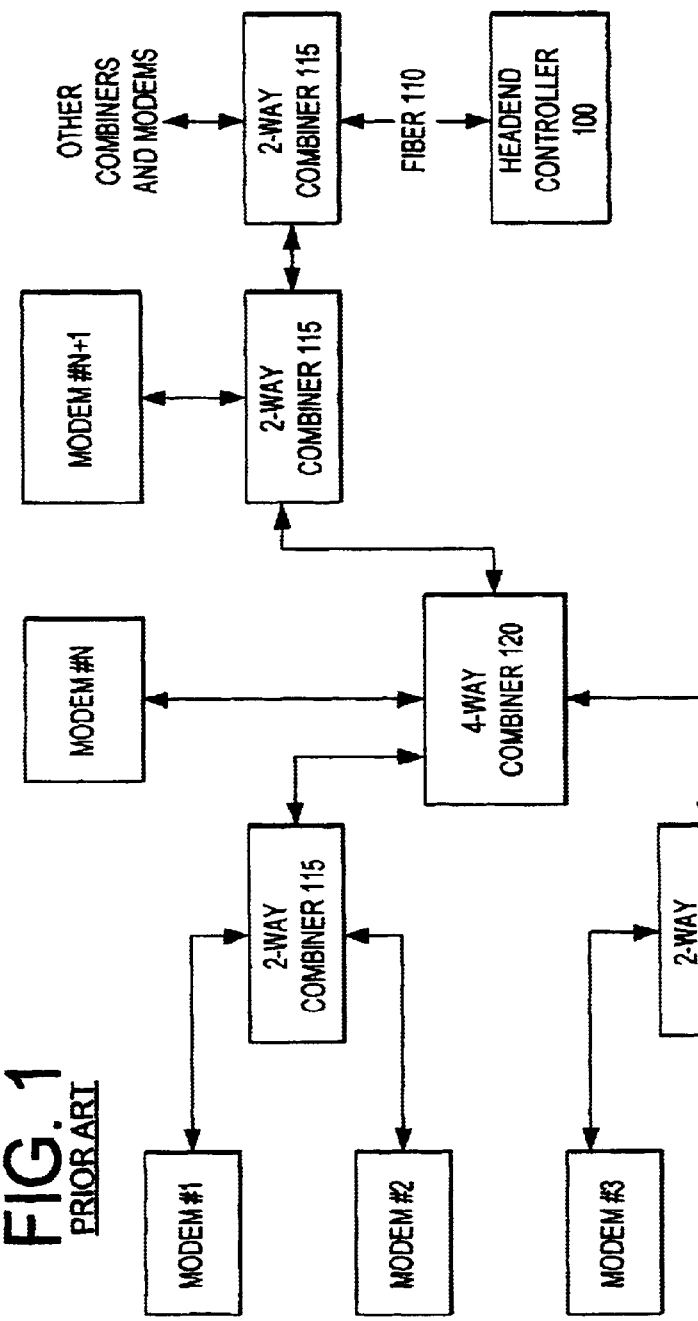
FIG. 1 illustrates, in block diagram form, a typical cable plant for a cable modem system.
Figure 2:
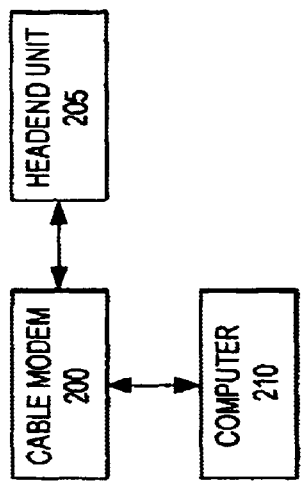
FIG. 2 illustrates, in block diagram form, a typical testing setup for a cable modem using a headend unit.
Figure 3:
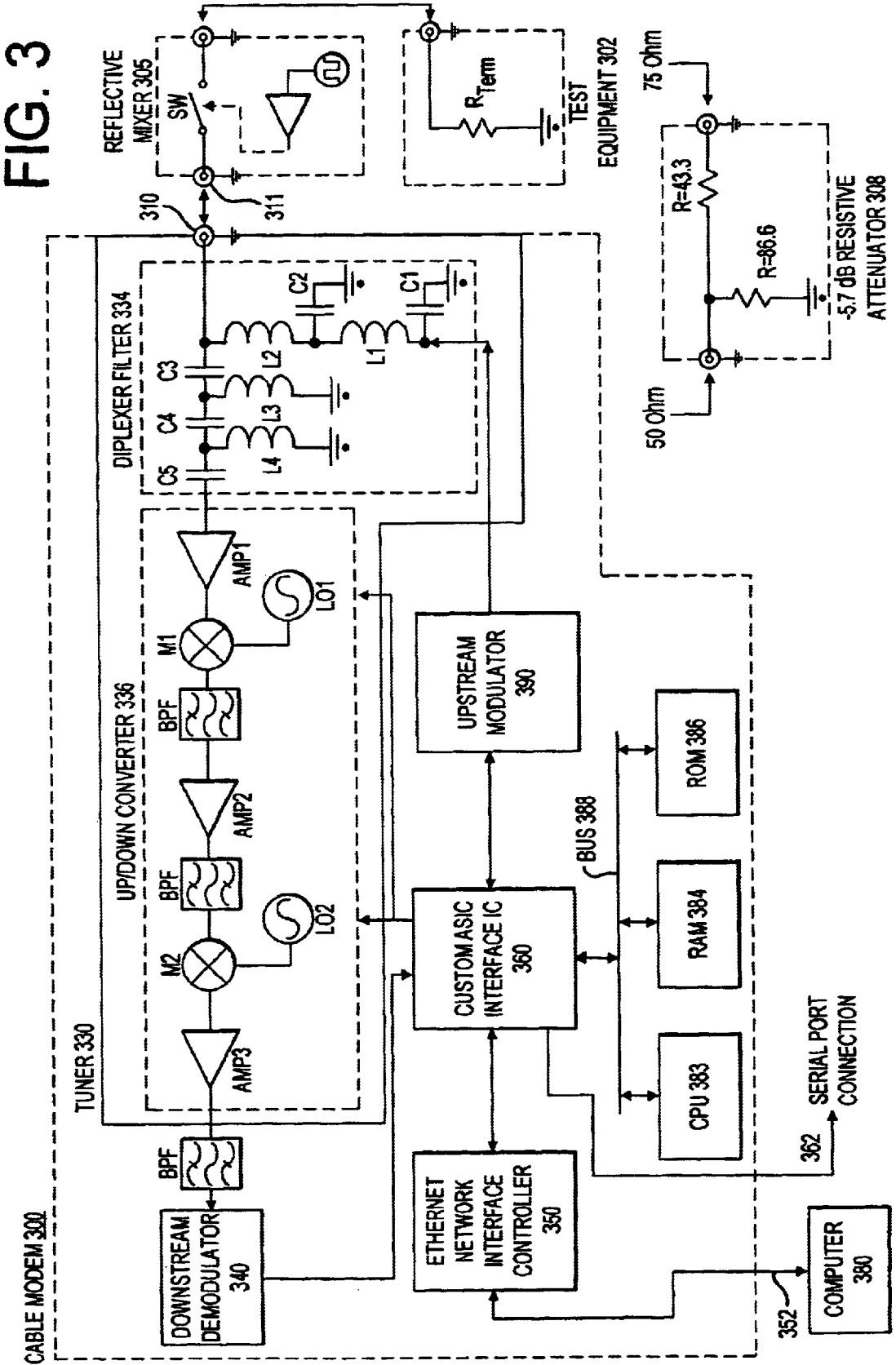
FIG. 3 illustrates, in simplified block diagram form, a cable modem coupled to a reflective mixer in accordance with one embodiment of the invention.

FIGS. 13(a)–(d) illustrate some further embodiments of an ideal reflective mixer configuration which could be used to implement the reflective mixer 305 of FIG. 3.

FIGS. 14(a)–(d) illustrate, in schematic diagram form, other embodiments of the reflective mixer of FIG. 9.

DETAILED DESCRIPTION

The present invention avoids some of the problems of currently known cable modem testing methods by providing a method and apparatus for performing simple operability testing without the use of a complicated headend unit. In one embodiment of the invention, a known stream of upstream data generated by a cable modem is utilized by the cable modem to test itself. This modulated upstream data can be reflected to a higher frequency that the tuner/receiver of the modem itself can demodulate. Thus, one embodiment of the invention forms an RF loopback within the cable modem in order to perform simple operability tests on components within the cable modem. This embodiment of the invention could be used for instance, to perform "power on self tests" (POST) of the RF hardware (modulator, demodulator, tuner) on new modems off of a manufacturing assembly line. This concept is explained more fully below in which a detailed description of preferred embodiments is provided with respect to the figures.

FIG. 3 illustrates a block diagram of a two-way cable modem 300 that is coupled to a reflective mixer 305, and a computer 380 such that the cable modem 300 may be tested in accordance with one embodiment of the present invention. The cable modem 300 includes a 75 ohm coaxial cable input/output 310, a tuner 330, a downstream demodulator 340, an Ethernet network interface controller 350, a custom ASIC Interface integrated circuit 360, an upstream modulator 390, a CPU 383, a RAM 384, and a ROM 386. The tuner 330 is comprised of a diplexer filter 334 including a high pass and low pass filter, and an up/down frequency converter 336. The diplexer filter 334 (highpass/lowpass), which is coupled to the input of the modem 300, separates the low power, high frequency downstream signal coming from the head-end, from the high power, lower frequency upstream signal generated by the cable modem 300 itself. In one embodiment of the cable modem 300, the downstream signal is a QPSK, 16-QAM, 64-QAM, or 256-QAM signal in a frequency range of 54–850 MHz with a power level of between −15 dBmV and +15 dBmV—the upstream signal covers a frequency range of 5–65 MHz or from 5–42 MHz with power levels ranging between +8 dBmV and +58 dBmV.

The tuner 330 is coupled to and receives modulated data from the upstream modulator 390 to be transmitted upstream to the headend. This data passes through the low pass filter of the diplexer filter 334 and is output through the coaxial cable input/output 310. The cable modem 300 receives modulated downstream input data from the cable headend via the coaxial cable input/output 310. This downstream input data passes through the tuner 330 via the high pass filter of the diplexer filter 334 and is then processed by the up/down converter 336 by a series of amplifiers (AMP1, AMP2, AMP3), mixers (M1, M2), and band pass filters (BPF) as shown in FIG. 3. The output of the up/down converter 336 is filtered by a band pass filter and then received by the downstream demodulator 340 which demodulates the downstream input data.

The custom ASIC Interface integrated circuit 360 is coupled to the downstream demodulator 340, the upstream modulator 390, and the Ethernet network interface controller 350 such that data can be passed to and from these components. Further, the custom ASIC Interface integrated circuit 360 is coupled to the CPU 383, the RAM 384, and the ROM 386 through the internal modem bus 388. The custom ASIC Interface integrated circuit 360 contains circuitry which, in conjunction with command signals generated by the CPU 383, serves to control the overall operation of the cable modem 300. The RAM 384 and the ROM 386 of the cable modem 300 serve to store, read and write data to be utilized by the modem 300, and to store operating instructions and configuration data for the modem 300. In one embodiment of the modem 300, the custom ASIC Interface integrated circuit 360 also serves to perform media access control (MAC) functions.

The cable modem 300 is coupled to an external computer 380 such as a personal desktop computer via the ethernet network interface controller 350 on line 352. In the illustrated embodiment, the custom ASIC Interface integrated circuit 360 may interface with the computer 380 through the ethernet network interface controller 350 when it is time to send data to the headend of the cable modem system. This data can then be sent from a typical storage medium in the computer 380 (such as from a RAM, a ROM, an EEPROM, a floppy disk drive, or a CDROM) and into the custom ASIC Interface integrated circuit 360 where it is then passed to the upstream modulator 390 and the low pass filter of the diplexer filter 334 before being transmitted to the cable system headend via the coaxial cable input 310. Further, demodulated downstream input data from the downstream demodulator 340 may be sent to the computer 380 via the custom ASIC Interface integrated circuit 360 and the ethernet network interface controller 350. This demodulated downstream input data may then be stored and/or utilized by the computer 380 to perform a number of computing operations in accordance with software programs being run on the computer 380.

When the cable modem 300 is to be tested in accordance with one embodiment of the invention, the reflective mixer 305 is connected to the cable input/output 310 of the cable modem 300 via the cable output 311 of the reflective mixer 305. The reflective mixer 305 operates by placing either a matched load (switch SW is closed) or an open circuit (switch SW is open) on the input/output 310 of the cable modem 300. As will be described more fully below with respect to FIG. 4, the cable modem 300 then generates a known upstream modulated signal with the upstream modulator 390. This upstream modulated signal is then provided as an RF output at the input/output 310 of the cable modem 300. When the switch SW is closed, the RF output of the modem 300 is terminated and no reflection of the RF output signal occurs. When the switch SW is open, the upstream signal is reflected back to the modem 300 at a higher frequency, with essentially zero phase shift. In reality, the reflected energy arrives back at the modem input/output 310 with a random, though fixed, phase shift. This is due to the fact that there is a finite length of transmission line between the switch SW of the reflective mixer 305 and the modem input/output connector 310. This finite length of line will impart a phase shift to the reflected signal just due to the time delay of the signal passing over it. However, for the simple testing purposes of the present invention, the phase of the reflected signal is not important.

The reflected signal is received by the cable modem 300 in the same manner as described above for downstream data. The action of the switch SW reflecting the outgoing signal from the upstream modulator 390 of the cable modem 300 acts as a form of sampling mixer. An ideal sampling mixer will create replicas of the original low frequency spectrum at unit multiples of the sampling rate, as shown in FIG. 5. In effect, the low frequency spectrum of the upstream output is replicated about the sample rate and all of its harmonics. If the switch SW is closed for only a very short period of time, the aperture of the sampling mixer is small. This leads to replicated spectra out to very high frequencies. As the aperture time is increased, the higher frequency replicas of the original low frequency signal will tend to be reduced in amplitude and will have amplitude nulls at multiples of aperture time.

In one embodiment of the invention, a user can interface with the computer 380 which interfaces with the cable modem 300 and the reflective mixer 305 in order to perform an RF hardware operability test of the modem 300. The user may attach the reflective mixer 305 to the input/output connector 310 of the cable modem 300 and initiate a test program run by the computer 380. The test program, which may reside in any suitable storage media within the computer 380, provides commands from the computer which serve to control the operation of the cable modem 300 through the Custom ASIC Interface 360 and the CPU 383. The test program, in one embodiment, may cause the modem 300 to generate a known modulated signal with the upstream modulator 390 which is reflected back into the modem 300 by the reflective mixer 305 such that a signal of a frequency high enough to be received by the tuner 330 is demodulated by the downstream demodulator 340. The demodulated downstream signal may then be compared to the original known test signal to test the operation of the modem. This test process is described more fully below with respect to the process flow diagram of FIG. 4. In another embodiment of the invention, the test described above may be controlled by a test program stored within the modem 300 itself, such as on the ROM 386. The CPU 383 may run the test program and generate command signals to operate the modem RF hardware as described above. In still another embodiment, the test as described above may be performed by attaching a piece of test equipment, such as a computer running a test program, directly to the custom ASIC interface IC 360 of the modem through the serial port connection 362.

In another embodiment of the reflective mixer testing method of the present invention a piece of test equipment 302—such as a spectrum analyzer—may be coupled to the reflective mixer 305. In this manner, a user could visually inspect the modulated output signal of the modem 300 to check the basic operation of some of the RF hardware of the modem 300. Finally, also shown in FIG. 3 is a –5.7 dB resistive attenuator (pad) 308 which may be connected between the cable modem 300 and the reflective mixer 305 in one embodiment of the invention. The –5.7 dB resistive attenuator (pad) 308 can be used to match the impedance of a 75 ohm cable modem 300 when test equipment 302 is to be utilized which has an impedance of 50 ohms.

Figure 4:
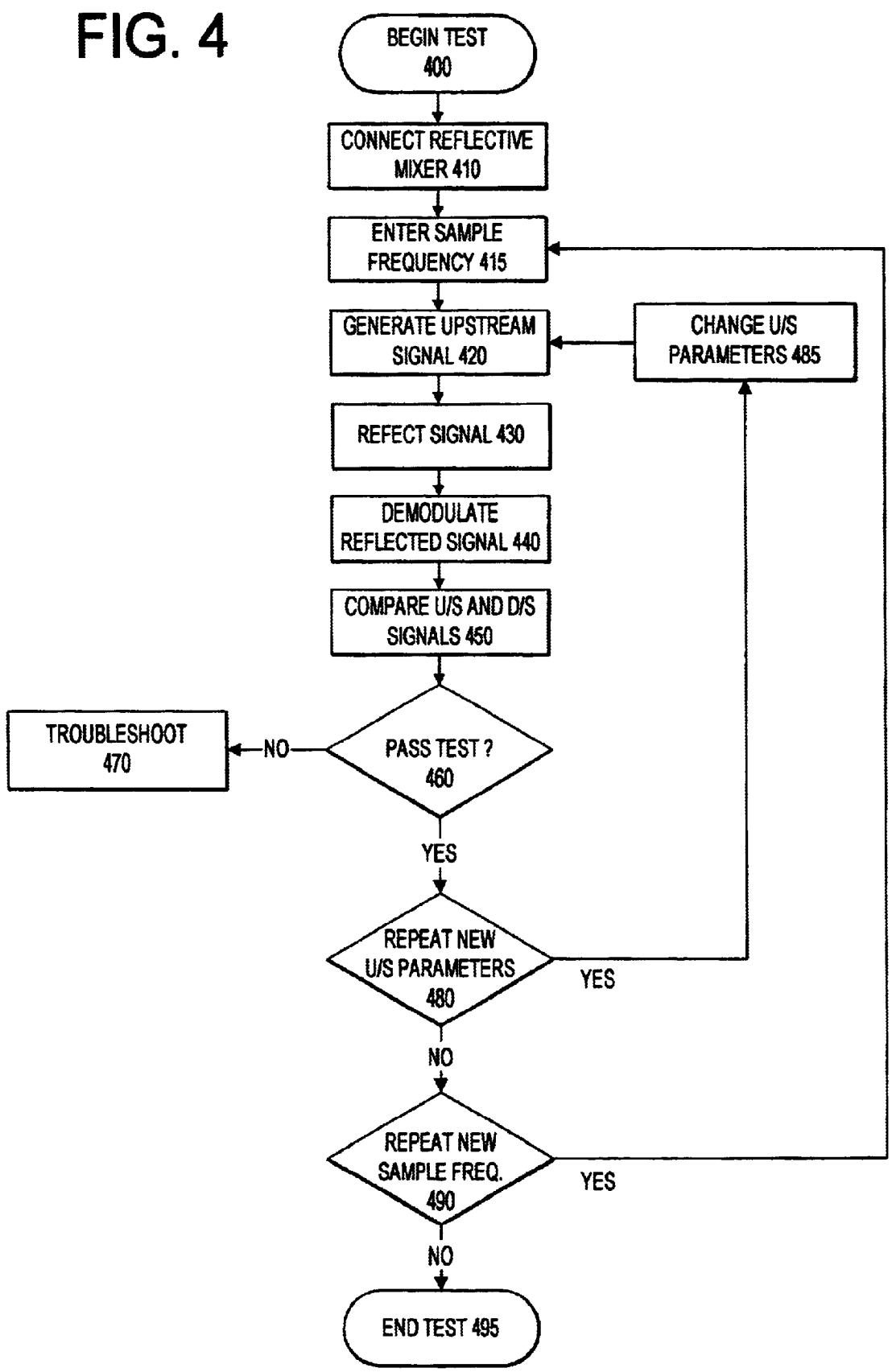
FIG. 4, illustrates a simplified process flow diagram which describes a method of testing a cable modem in accordance with one embodiment of the invention.

FIG. 4 illustrates a process flow diagram that describes a method of testing the cable modem 300 in accordance with one embodiment of the invention—references to elements found in FIG. 3 are also made below. The method is begun at block 400. At block 410, a reflective mixer 305 is connected to the output of the cable modem 300, and at block 415 a reflective mixer 305 sample frequency is selected. In one embodiment of the invention, the reflective mixer 305 sample frequency is set at 100 MHz. In other embodiments of the invention, this sample frequency may be selected to any frequency which results in the generation of a reflected signal that is of a frequency(ies) high enough to be passed through the high pass filtering of the cable modem's tuner 330 and then demodulated by the demodulator 340. At block 420, an upstream signal is generated in the cable modem 300 by the upstream modulator 390. In one embodiment of the invention, this step is controlled by a computer 380 running a test program which produces command signals from the computer 380 to the cable modem 300. These commands, in one case, may place the upstream modulator 390 in a test mode in which the upstream modulator 390 produces a continuous output signal at a sample frequency of a random bit sequence. In one embodiment, the test mode of the upstream modulator 390 causes a 16-QAM modulated 1.28 mega-symbols per second signal centered at 20 MHz and with pseudo-random bit sequence intervals to be generated by the upstream modulator 390. In another embodiment, the computer 380 can provide a user or randomly selected set of parameters by which the upstream modulator 390 is to provide a modulated output. This set of parameters may include values for parameters such as the data symbol rate, modulation scheme, and center frequency of the output signal of the upstream modulator 390.

At block 430, a reflected signal is generated. The reflected signal that is generated depends upon the sample frequency of the reflective mixer 305 as well as the center frequency of the modulated signal. As illustrated in FIG. 5, if the modulated signal center frequency is 20 MHz, and the sample frequency of the reflective mixer 305 is 100 MHz (as is the case in one embodiment of the invention as described above), the reflected signal will comprise mixed signals at each harmonic of the reflective mixer sample frequency. Therefore, as shown in FIG. 5, the reflected signal will comprise signal information at 20, 80 and 120 MHz, 180 and 220 MHz, 280 and 320 MHz, and so forth throughout the harmonics of 100 MHz.

At block 440, the portion of the reflected signal that is processed through the tuner 330 is demodulated by the demodulator 340. In one embodiment, the computer 380—under the direction of the test program—controls which frequencies the demodulator 340 is instructed to demodulate at, and which type of demodulation scheme to employ, which in one embodiment is 16-QAM. Note that the portion of the reflected signal whose frequency is below the minimum downstream frequency response of the tuner 330 of the modem 300 will not be demodulated. In one embodiment of the invention, the cable modem 300 has a minimum downstream frequency response of about 54 MHz. Therefore, without some means —in this case a reflective mixer 305— of generating a higher frequency replica(s) of the modulated signal, the demodulator 340 would not be able to receive the data generated by the modulator 390. In one embodiment, the cable modem 300 downstream frequency response is approximately 54–850 MHz. In order to fully test the demodulator 340 circuitry of the modem, the entire frequency range should be tested to some degree. In one embodiment of the invention, this can be accomplished quickly by demodulating three frequencies of the reflected signal which correspond to a low, medium, and high frequency with respect to the frequency range of the demodulator 340. For instance, if a 20 MHz modulated signal were reflectively mixed at 100 MHz, the demodulator 340 could be instructed to demodulate those portions of the reflected signal at 80 MHz, 380 MHz, and 820 MHz to check the low, middle, and high ends of the demodulator's range of operation. This instruction could be provided to the demodulator 340 through the custom ASIC 360 by the computer 380 running the test program in one embodiment.

At block 450, each of the signals that was demodulated is compared to the signal that was modulated. By comparing the data contained in the demodulated signals to the data contained in the signal that was originally modulated, the accurate operation of the cable modem's RF hardware including the modulator 390, the tuner 330, and the demodulator 340 can be verified. In one embodiment, a quick test can be performed in which the comparison of the data is not a bit-to-bit comparison. In this type of quick test, the signals can be compared to see if they lock on several characteristics such as amplitude, carrier, and symbol timing (1.28 mega-symbols per second in one embodiment). In a more robust embodiment of the test, the signals can be compared on a bit-to-bit level—wherein, if the modulator 390 and demodulator 340 are operating perfectly, the pseudo-random bit sequence coming out of the demodulator 340 should be equivalent to the pseudo-random bit sequence entering the modulator 390.

At block 460, a decision is made as to whether the modem 300 has passed the test employed. If not, the modem 300 may either be discarded or set aside for later troubleshooting, shown as block 470. If the modem 300 has passed the test, at block 480, a decision is made as to whether or not to repeat the test for a different set of upstream modulation parameters such as center frequency, modulation scheme, and/or symbol rate. The center frequency, modulation scheme, and/or symbol rate is changed at block 485. In one embodiment, this decision can be made by the test program being run on the computer 380 based upon the results of the testing that has already taken place—in the same respect the change of center frequency, modulation scheme, and/or symbol rate may also be implemented by the computer 380 running the test program through the issuance of commands through the custom ASIC 360 to the modulator 390 of the modem. In another embodiment, the decision is made by the user through an interface with the computer 380 running the test program. Repeating the test for additional modulated signal center frequencies serves not only to test the operation of the modulator 390 over its range of operation, but also to further test the range of operation of the demodulator 340.

Finally, at block 490 a decision is made whether or not to repeat the test for a different reflective mixer sample frequency. If not, the reflective mixer test of the modem 300 ends at block 495, and another modem can be tested. If a more detailed testing of the demodulator 340 portion of the modem 300 is desired, the sample frequency of the reflective mixer 305 can be changed at block 415, and the testing as described above can be repeated for this new frequency. This may be desired simply to test an extended portion of the demodulator's frequency range. As noted above, in one embodiment of the invention, the cable modem 300 may have a downstream frequency response of 54–850 MHz. Thus, in order to test this wide frequency range in a more detailed manner, a user could run the test for a number of different reflective mixer sample frequencies.

As previously described above, FIGS. 5(*a*)–(*b*) illustrate an original upstream signal as it would appear on the output of a typical cable modem, and the upstream signal after being reflected by a reflective mixer 305. In the case illustrated the modulated signal center frequency is 20 MHz, and the sampling frequency of the reflective mixer 305 is 100 MHz (as is the case in one embodiment of the invention as described above). As shown, the reflected signal will comprise mixed signals at each harmonic of the reflective mixer sample frequency. Therefore, as shown in FIG. 5(*b*), the reflected signal will comprise signal information at 20 MHz, 80 and 120 MHz, 180 and 220 MHz, 280 and 320 MHz, and so forth throughout the harmonics of 100 MHz. If the center frequency of the modulated signal were changed to 10 MHz, the reflected signal would comprise signal information at 10 MHz, 90 and 110 MHz, 190 and 210 MHz, 290 and 310 MHz, and so forth throughout the harmonics of 100 MHz.

FIG. 6 is a block diagram illustrating a circuit that can be used to simulate the action of a reflective mixer attached to a cable modem. The simulation circuit 600 comprises a pseudo-random bit sequence (PRBS) generator 610, a low pass filter 620, a signal mixer 630, a 10 MHz sinusoid generator 650, an on/off signal mixer 640, and a 100 MHz pulse train generator 660. The PRBS generator 610 provides a pseudo-random digital signal at 1 Mbps to the low pass filter 620 which, in one embodiment is a 500 KHz lowpass filter (5th order, linear phase). The filtered PRBS data is then provided as an input to the signal mixer 630. Also provided as an input to the signal mixer 630 is the output of the 10 MHz sinusoid generator 650. The signal mixer 630 acts to upconvert the PRBS data in frequency by multiplying the input PRBS data with the 10 MHz sinusoid input. The signal mixer 630 thus generates a 10 MHz BPSK signal at its output and provides this signal as an input to the on/off signal mixer 640. This 10 MHz BPSK signal is used to simulate an actual upstream cable modem signal—except that it is BPSK rather than QPSK or 16-QAM—that is to be reflected back into the modem by a reflective mixer. This serves for the simulation purposes of the simulation circuit 600 since a BPSK signal is very similar to a QPSK signal (which is the typical modulation used by a cable modem) in that it is simply another type of phase modulation. The output of the 100 MHz pulse train generator 660 is provided as a second input to the on/off signal mixer 640. The repetitive pulse train signal has a pulse width of 5 nsec and is at one of two levels: 0 volts or 1 volt. When the pulse train is at zero volts, no signal is seen at the output of the on/off signal mixer 640. When the pulse train is at 1 volt, the 10 MHz BPSK signal passes through the on/off signal mixer 640 unattenuated. The action of the signal mixer 640 acts a sampling gate with an output that simulates the output of a reflective mixer circuit coupled to a typical cable modem transmitting an upstream signal.

In a real reflective mixer testing setup in accordance with the present invention, the cable modem will use either a QPSK or 16-QAM signal, filtered with a square-root raised cosine filter (instead of the analog lowpass filter discussed with respect to the simulated reflective mixer) as described previously with respect to FIGS. 3 and 4. However, in simulating the results of a particular test setup, one is only interested in how a representative digitally modulated signal can be turned into a series of high frequency versions of itself using a reflective mixer. For the purposes of simulation, a BPSK signal was easier to set up. FIGS. 7 and 8 illustrate the results of using the circuit described with respect to FIG. 6 to simulate the effect of using a reflective mixer 305 to test a cable modem 300. FIG. 7 shows the frequency spectrum of the original upstream signal at 10 MHz. FIG. 8 shows how the action of the simulation circuit 600 results in replicas of the original upstream signal at 10 MHz above and below the sampling frequency. In the example shown in FIG. 8, the sampling frequency is 100 MHz.

As discussed previously with respect to FIG. 3, the reflective mixer 305 operates by placing either a matched load (switch SW is closed) or an open circuit (switch SW is open) on the input/output 310 of the cable modem 300. Prior to discussing various implementations of the reflective mixer circuit, it would be beneficial to discuss the principle behind the generation of a reflected signal and how it is affected by load matching. In general, the output connector of a cable modem is coupled to a transmission line with some transmission line impedance ($Z_O$) which terminates in some manner and thus has some termination load or impedance ($Z_L$) associated with it. For instance, in the case of a cable modem whose output connector is not connected to anything external to the modem, the transmission line ends in an open circuit, and thus the termination load or impedance is infinite. An upstream signal generated by a cable modem will propagate up the transmission line, while any reflection of that upstream signal will propagate down the transmission line and into the cable modem. The generation of a reflected signal depends on the reflection coefficient of the system, where the reflection coefficient is equal to the ratio of the reflected voltage to the incident voltage. Another way of stating the value of the reflection coefficient is according to the following equation where: $\rho=(Z_L-Z_O)/(Z_L+Z_O)$. Thus, the magnitude of $\rho$ describes the magnitude of the reflected signal, while the sign of $\rho$ describes the phase relationship of the reflected signal to the incident signal—if $\rho$ is negative the reflected signal is out of phase with the incident signal. Note that $\rho$ can be reactive (have complex units), therefore any phase and amplitude is possible for $\rho$. Table 1 below summarizes the effect of a number of different values for $Z_L$ on the reflection coefficient for a number of special cases.

TABLE 1

(Special Cases of $Z_L$)

| $Z_L$ | $\rho$ | Comment |
|---|---|---|
| $Z_O$ | 0 | Matched load, no reflection (Normal operations) |
| $\infty$, ($>>Z_O$) | +1 | Open circuit, total reflection, in phase |
| 0 | −1 | Short circuit, total reflection, out of phase |

TABLE 1-continued (Special Cases of $Z_L$)

| $Z_L$ | ρ | Comment |
|---|---|---|
| $2Z_O$ | +1/3 | 1/3 incident wave reflected, in phase |
| $Z_O/2$ | −1/3 | 1/3 incident wave reflected, out of phase |

As shown in the above Table 1, if the transmission line terminates with a matched load—in the case of the typical cable modem this is 75 ohms—then the entire signal that goes down the transmission line gets dissipated in the load. In other words, when the load is matched to the transmission line impedance nothing reflects back, which in normal modem operations is the ideal operation point. Everything goes into the load. Which is ideally how you want it. As shown in table 1, for any value of $Z_L$ which is not equal to $Z_O$, there is some reflection of signal. Therefore, one can see that for any termination impedance other than $Z_L$=75 ohms in this case, some energy will be reflected back into the cable modem. Therefore, in designing a circuit to implement the reflective mixer to be used in the present invention the goal was to implement a scheme that changes the $Z_L$ from 75 ohms to some other value that reflects a signal at a very rapid rate.

FIG. 9 illustrates a detailed circuit schematic of one embodiment of a reflective mixer circuit designed to perform the function described above. The circuit described by FIG. 9 can be used as one implementation of the reflective mixer 305 of FIG. 3. The circuit comprises FET transistor T1, capacitors C1, C2, C3, and C4, resistors R1, R2, R3, and $R_{BIAS}$, and coaxial cable input/output connectors 902, 904, and 906. Values of the components utilized in one embodiment of the invention are tabulated in Table 2 below.

TABLE 2

| Component | Value |
|---|---|
| R1 | 51 or 510 Ohms |
| R2 | 51 or 510 Ohms |
| R3 | 510 Ohms |
| $R_{BIAS}$ | 1 kOhm |
| $V_{BIAS}$ | −3.3 V |
| T1 | NE76118 |
| C1, C2, C3, C4 | 0.01 uF |

Connector 902 is coupled to cable modem 300 when the cable modem is being tested as described above with respect to FIGS. 3 and 4. In the configuration of the circuit with the values of Table 2, the circuit is designed to be coupled to the modem 300 through the −5.7 dB attenuator 308 of FIG. 3. Connector 904 may be coupled to test equipment 302, such as a spectrum analyzer, during testing as described previously. Connector 906 is coupled to the output of signal generator 910 to receive the 100 MHz pulsed train signal from the signal generator 910 as described earlier. In one embodiment, the signal generator 910 may produce a large amplitude sine wave which, for the purposes of the reflective mixer testing described herein, serves the same purpose that a square wave or pulse train would. For, a large amplitude sine wave would have the effect of turning FET transistor T1 on and off quickly.

Capacitor C1 is coupled to the connector 902 and to node 912 which is also connected to the source of FET transistor T1. Node 912 is also coupled to ground through resistor R1. Similarly, capacitor C2 is coupled to the connector 904 and to node 914 which is also connected to the drain of FET transistor T1. Node 914 is also coupled to ground through resistor R2. Capacitor C4 is coupled to the connector 906 and to node 916 which is also connected to the gate of FET transistor T1. Bias voltage is provided to the gate of T1 via resistor R3 which is connected between nodes 916 and 918. Node 918 is coupled to ground through capacitor C3. The bias voltage is provided at node 918 from node $V_{BIAS}$ across the variable resistor $R_{BIAS}$ which is connected between $V_{BIAS}$ and ground.

The operation of the reflective mixer circuit of FIG. 9 is as follows. When the output of the signal generator 910 is low, the transistor T1 is off and no current flows through it. This provides the cable modem 300 with a matched 50 ohm termination load through resistor R1 to ground, and therefore no energy is reflected back into the modem 300. When the pulsed train output of the signal generator goes high, the transistor T1 turns on providing a path for current flow through T1. Therefore, when the transistor T1 turns on current flow is divided through three separate 50 ohm loads in parallel such that loads no longer match on the termination of the signal. For, there is an effective 25 ohm termination on both the connector 902 and the connector 904. Because of this mismatch, some of the incident energy of the upstream signal from the cable modem 300 is reflected back into the cable modem—in this case the reflected signal is also out of phase with the upstream signal since the reflection coefficient is negative.

FIG. 10 illustrates a block diagram of a test set-up that was utilized to illustrate the action of the reflective mixer circuit embodied by the circuit of FIG. 9 described above. The test set-up comprises cable modem 300, −5.7 dB resistive attenuator 308, 6 dB splitter 1010, spectrum analyzer 1005, reflective mixer 900, and signal generator 910. The cable modem 300 is coupled to the −5.7 dB attenuator 308 via a 75 ohm connector line. The −5.7 dB resistive attenuator 308 is coupled to 6 dB splitter 1010 via a 50 ohm connector line. The 6 db splitter 1010 splits the upstream signal from the cable modem 300 and provides the upstream signal to a spectrum analyzer 1005 and to the reflective mixer 900. The spectrum analyzer 1005—which can be implemented by an HP 8563E—could therefore be used to monitor both the downstream (reflected) signal and the upstream signal provided by the cable modem 300. The upstream signal provided to the reflective mixer is reflected as described above with respect to FIG. 9 as controlled by the signal generator 910 which acts to provide a signal which sequentially turns transistor T1 on and off at approximately 100 MHz in this case. In the test set-up shown in FIG. 10, the signal generator 910 may be implemented by a signal generator such as an HP 8648C model providing an overdriven 100 MHz sinusoid wave at +10 dBm which in essence acts as a pulse train generator by driving the FET T1 into total on or off operation. The set-up of FIG. 10 was designed and used for test purposes since most test equipment is 50 ohm equipment. In the actual testing of a cable modem using a reflective mixer in accordance with one embodiment of the present invention a splitter would not generally be used and the mixer could be designed with 75 ohm connections to avoid the need for the −5.7 dB attenuator 308. Therefore, in order to test a cable modem in accordance with the present invention, only the signal generator 910 and the reflective mixer 900 are required.

FIGS. 11(a)–(b) and 12(a)–(b) illustrate the use of the reflective mixer 900 in the test set-up of FIG. 10. FIG. 11(a) illustrates the spectrum of the original 1.28 MSps 16-QAM upstream signal at a 10 MHz center frequency as provided by a cable modem operating in accordance with one embodiment of the present invention. FIG. 11(b) illustrates the resulting broadband spectrum when the reflective mixer 900 is off. Notice that there is only the original 10 MHz signal. FIG. 12(a) illustrates the broadband spectrum when the reflective mixer 900 is turned on. Notice that a replicated spectra of the original 10 MHz 16-QAM signal appears at 100 MHz+/−10 MHz, 200 MHz+/−10 MHz, and so on at each harmonic of 100 MHz as described previously above. FIG. 12(b) illustrates a close-up of the spectrum at a center frequency of 90 MHz. Notice how this signal is the same, except for amplitude, as the original 16-QAM upstream signal at 10 MHz illustrated in FIG. 11(a). Notice also in FIG. 12 (a) that there is some feedthrough of the sampling signal at increments of 100 MHz. This is due to RF feedthrough across the FET transistor T1. Also notice that the signals around 200 MHz are smaller in amplitude than the signals at 100 MHz and 300 MHz. This is due to the fact that a 100 MHz squarewave (actually an overdriven sine wave) was used to implement the signal generator 910 instead of a 100 MHz impulse train. Even harmonics of a squarewave (i.e. 200 MHz, 400 MHz, . . . ) are ideally zero, though some leakage always occurs in an actual system. Nevertheless, the operation of the reflective mixer 900 is evident in these results.

FIGS. 13(a)–(d) illustrate some further embodiments of an ideal reflective mixer configuration which could be used to implement the reflective mixer 305 of FIG. 3. FIG. 13(a) illustrates a shunt-short embodiment of the reflective mixer 305. This embodiment comprises a node 1301 between the coaxial cable input/output connectors 902 and 904, and a switch SW1 which is connected between node 1301 and ground. The switch SW1 is controlled by reference pulse signal generator $f_{REF}$ through amplifier AMP4. Further, a terminating impedance, such as a piece of test equipment 302 (spectrum analyzer), is coupled to connector 904, and a cable modem 300 is coupled to connector 902. When the switch SW1 is open any upstream signal from the modem 300 is terminated with a matching impedance and no signal is reflected back. When switch SW1 is closed a direct short to ground is provided for the termination of the upstream signal thus interrupting the impedance matching and causing a signal to be reflected back into the cable modem 300.

FIG. 13(b) illustrates a series-open embodiment of the reflective mixer 305. This embodiment comprises connectors 902 and 904 which are coupled to the cable modem 300 and test equipment 302 respectively. Connector 902 is coupled to one end of switch SW2 via line 1302, and resistor $R_{L1}$ is connected between line 1302 and ground. Connector 904 is coupled to the other end of switch SW2 via line 1303, and resistor $R_{L2}$ is connected between line 1303 and ground. The switch SW2 is controlled by reference pulse signal generator $f_{REF}$ through amplifier AMP5. When the switch SW2 is open any upstream signal from the modem 300 is terminated with a matching impedance via resistor $R_{L1}$ and no signal is reflected back. When switch SW2 is closed the upstream signal has several termination paths to ground ($R_{L1}$, $R_{L2}$, and test equipment 302) thus interrupting the impedance matching and causing a signal to be reflected back into the cable modem 300.

FIG. 13(c) illustrates a single-ended shorting embodiment of the reflective mixer 305. This embodiment comprises connector 902 which is coupled to the cable modem 300. Note that in this embodiment there is no connector for test equipment. Connector 902 is coupled to one end of switch SW3 via line 1304, resistor $R_{L3}$ is connected between line 1304 and ground, and switch SW3 is also connected between line 1304 and ground. The switch SW3 is controlled by reference pulse signal generator fREF through amplifier AMP6. When the switch SW3 is open any upstream signal from the modem 300 is terminated with a matching impedance via resistor $R_{L3}$ and no signal is reflected back. When switch SW3 is closed a direct short to ground is provided for the termination of the upstream signal thus interrupting the impedance matching and causing a signal to be reflected back into the cable modem 300.

FIG. 13(d) illustrates a single-ended open embodiment of the reflective mixer 305. This embodiment comprises connector 902 which is coupled to the cable modem 300. Note that in this embodiment there is no connector for test equipment. Connector 902 is coupled to one end of switch SW4. Resistor $R_{L4}$ is connected between the other end of switch SW4 and ground. The switch SW4 is controlled by reference pulse signal generator $f_{REF}$ through amplifier AMP7. When the switch SW3 is closed any upstream signal from the modem 300 is terminated with a matching impedance via resistor $R_{L4}$ and no signal is reflected back. When switch SW3 is open, the upstream signal from the cable modem 300 is open circuited thus providing for the generation of a reflected signal because of the infinite impedance of the line termination.

Figure 14A:
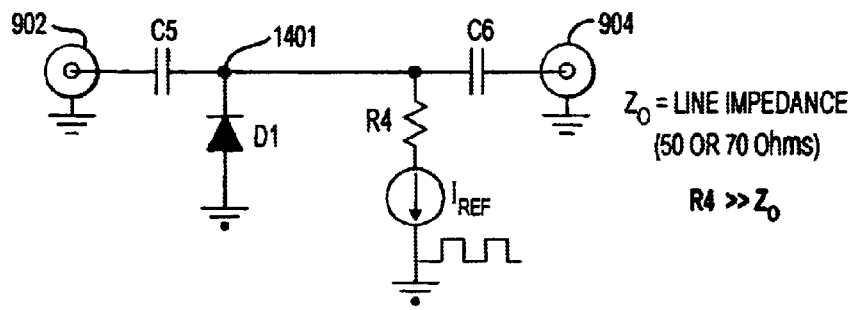

FIGS. 14(a)–(d) illustrate, in schematic diagram form, other embodiments of the reflective mixer 900 of FIG. 9. FIG. 14(a) illustrates a schematic diagram of a first alternate embodiment of the reflective mixer 900. This embodiment comprises connectors 902 and 904 which are coupled to the cable modem 300 and test equipment 302 respectively, and also comprises capacitors C5 and C6, resistor R4, diode D1, and current source $I_{REF}$. Capacitor C5 is coupled between connector 902 and node 1401, and diode D1 is coupled between node 1401 and ground. Capacitor C6 is coupled between connector 904 and node 1401, and node 1401 is also coupled to ground through resistor R4 and current source $I_{REF}$. The current source $I_{REF}$ is a square wave or pulse current source. When the diode D1 is reverse biased it acts as a small capacitance, and for practical purposes, as an open circuit. When there is current flowing through the diode D1, it acts as a small resistor. Therefore, when the current source $I_{REF}$ is not pulling current (it is low) through R4, then no current is flowing through D1, and D1 is reverse biased. Thus, when $I_{REF}$ is low, any upstream signal from the modem 300 is terminated by the matched impedance of the test equipment via connector 904, and no reflected signal is generated. When $I_{REF}$ is high, current is pulled through diode D1, and the matched impedance is interrupted thereby generating a reflected signal back into the cable modem 300.

Figure 14B:
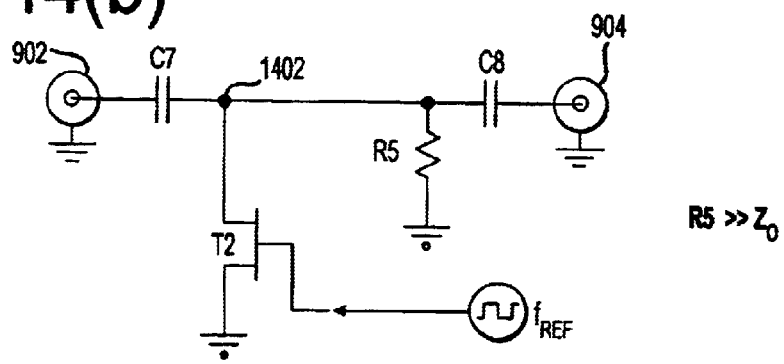

FIG. 14(b) illustrates a schematic diagram of a second alternate embodiment of the reflective mixer 900. This embodiment comprises connectors 902 and 904 which are coupled to the cable modem 300 and test equipment 302 respectively, and also comprises capacitors C7 and C8, resistor R5, FET transistor T2, and reference pulse signal generator $f_{REF}$. Capacitor C7 is coupled between connector 902 and node 1402 which is coupled to the source of transistor T2. The drain of transistor T2 is coupled to ground. Resistor R5 is coupled between node 1402 and ground, and capacitor C8 is connected between connector 904 and node 1402. The gate of transistor T2 is coupled to the output of $f_{REF}$. When $f_{REF}$ is high, the transistor T2 is turned on thereby providing a short circuit path for any upstream signal from the modem 300, and in turn generating a reflected signal back into the modem 300. When $f_{REF}$ is low, the transistor T2 is off, and since resistor R5>>$Z_O$, the impedance is essentially matched via the connector 904 and the test equipment 302 whose impedance is on the order of 50 or 75 ohms as described earlier. Thus, when $f_{REF}$ is low the upstream signal from the modem 300 is terminated with no reflections generated.

Figure 14C:
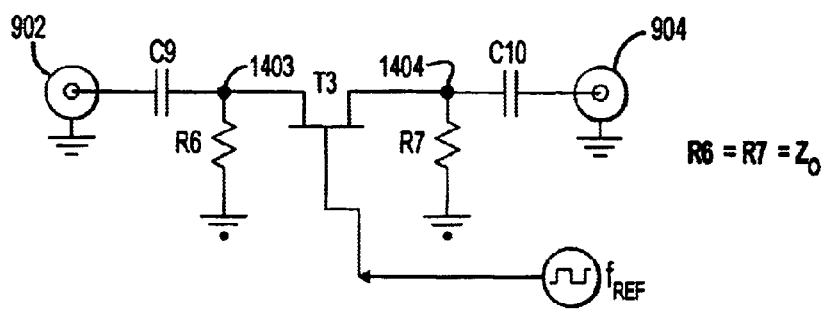

FIG. 14(c) illustrates a schematic diagram of a third alternate embodiment of the reflective mixer 900. This embodiment comprises connectors 902 and 904 which are coupled to the cable modem 300 and test equipment 302 respectively, and also comprises capacitors C9 and C10, resistors R6 and R7, FET transistor T3, and reference pulse signal generator $f_{REF}$. Capacitor C9 is coupled between connector 902 and node 1403 which is coupled to the source of transistor T3. Resistor R6 is coupled between node 1403 and ground. Capacitor C10 is coupled between connector 904 and node 1404 which is coupled to the drain of transistor T3. Resistor R7 is coupled between node 1404 and ground. The gate of transistor T3 is coupled to the output of $f_{REF}$. When $f_{REF}$ is high, the transistor T2 is turned on thereby providing a number of paths to ground for any upstream signal from the modem 300, and in turn generating a reflected signal back into the modem 300. When $f_{REF}$ is low, the transistor T3 is off, and since resistor $R6=Z_O$, the impedance is essentially matched via R6. Thus, when $f_{REF}$ is low the upstream signal from the modem 300 is terminated with no reflections generated.

Figure 14D:
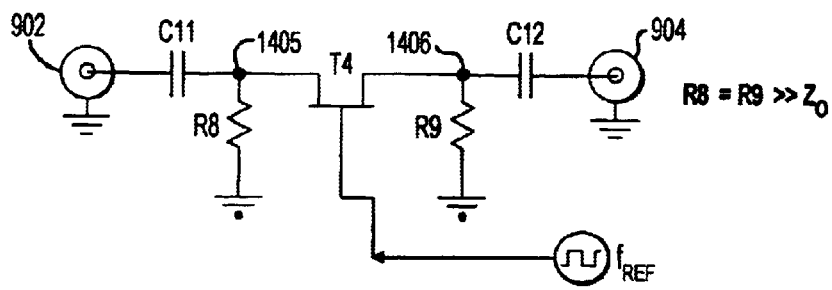

FIG. 14(d) illustrates a schematic diagram of a fourth alternate embodiment of the reflective mixer 900. This embodiment comprises connectors 902 and 904 which are coupled to the cable modem 300 and test equipment 302 respectively, and also comprises capacitors C11 and C12, resistors R8 and R9, FET transistor T4, and reference pulse signal generator $f_{REF}$. Capacitor C11 is coupled between connector 902 and node 1405 which is coupled to the source of transistor T4. Resistor R8 is coupled between node 1405 and ground. Capacitor C12 is coupled between connector 904 and node 1406 which is coupled to the drain of transistor T4. Resistor R9 is coupled between node 1406 and ground. The gate of transistor T4 is coupled to the output of $f_{REF}$. When $f_{REF}$ is high, the transistor T2 is turned on thereby providing a number of paths to ground for any upstream signal from the modem 300. However, since $R8=R9>>Z_O$, and the impedance of the test equipment 302 is approximately=$Z_O$, then most of the upstream signal is terminated through the test equipment 302, and essentially no reflected signal is generated. When $f_{REF}$ is low, the transistor T3 is off, and since resistor $R8>>Z_O$, the impedance is not matched thereby generating a reflected signal back into the modem 300.

Although illustrative embodiments of the invention have been described in detail herein with reference to the accompanying drawings, it is to be understood that the invention is not limited to those precise embodiments. They are not intended to be exhaustive or to limit the invention to the precise forms disclosed. As such, many modifications and variations will be apparent to practitioners skilled in this art. Accordingly, it is intended that the scope of the invention be defined by the following claims and their equivalents.

What is claimed is:

1. A method of performing an operability test on a communications system device, the method comprising the steps of:
   providing a set of output test data;
   generating an output signal with the communications system device in response to the set of output test data;
   providing the output signal as an input signal to a reflective mixer;
   generating a reflected signal with the reflective mixer in response to the output signal;
   wherein the reflected signal comprises a set of information signals, each of which comprises a signal that is essentially the same as the output signal; and
   wherein each information signal is centered about frequency that is essentially equal to a harmonic of a sample frequency plus or minus the center frequency of the output signal; and
   providing the reflected signal as a second input signal to the communications system device.

2. The method of claim 1, further comprising:
   generating a plurality of sets of input test data in response to the second input signal, wherein each of the sets of input test data corresponds to a particular information signal; and
   comparing at least one said of input test data with the set of output test data.

3. The method of claim 2, further comprising comparing at least one set of input test data to at least one other set of input test data.

4. The method of claim 3, further comprising providing an indication of whether the communications system device passed or failed the operability test.

5. The method of claim 3, wherein a machine executing a program of instructions tangibly embodied in a program storage device readable by the machine performs the steps of:
   comparing the at least one said of input test data with the set of output test data;
   comparing the at least one set of input test data to at least one other set of input test data; and
   providing the indication of whether the communications system device passed or failed the operability test.

6. The method of claim 5, wherein the machine further performs the steps of:
   generating a plurality of sets of input test data in response to the second input signal, wherein each of the sets of input test data corresponds to a particular information signal; and
   comparing at least one said of input test data with the set of output test data.

7. The method of claim 6, wherein the machine further performs the step of comparing at least one set of input test data to at least one other set of input test data.

8. The method of claim 7, wherein the machine further performs the step of providing an indication of whether the communications system device passed or failed the operability test.

9. A method of performing an operability test on a cable modem wherein the cable modem comprises a modulator, a demodulator, and a tuner, the method comprising:
   providing a set of output test data;
   generating a modulated output signal with the modulator in response to the set of output test data;
   providing the modulated output signal as an input signal to a reflective mixer;
   generating a reflective signal with the reflective mixer in response to the output signal;
   wherein the reflected signal comprises a set of information signals each of which comprise a signal that is essentially the same as the output signal; and
   wherein each information signal is centered about a frequency that is essentially equal to a harmonic of a sample frequency plus or minus the center frequency of the output signal;
   providing the reflected signal as a second input signal to the demodulator;

demodulator in the second input signal with the demodulator to generate at least one set of input test data; comparing at least one set of input test data with the set up output test data; and providing an indication of whether the cable modem passed or failed the operability test.

10. The method of claim 9, further comprising:

generating a plurality of sets of input test data in response to the second input signal, wherein each of the sets of input test data corresponds to a particular information signal; and comparing at least one set of input test data with the set of output test data.

11. The method of claim 10, further comprising comparing at least one set of input test data to at least one other set of input test data.

12. The method of claim 11, further comprising providing an indication of whether the communications system device passed or failed the operability test.

13. The method of claim 12, wherein a machine executing a program of instructions tangibly embodied in a program storage device readable by the machine performs the steps of:

comparing at least one set of input test data with the set of output test data;

comparing at least one set of input test data to at least one other set of input test data; and providing the indication of whether the communications system device passed or failed the operability test.

14. The method of claim 13, wherein generating the plurality of sets of input test data in response to the second input signal is performed by the demodulator in response to command signals generated by the machine executing the program of instructions.

15. The method of claim 14, wherein providing the set of output test data is performed by the modulator in response to command signals generated by the machine executing the program of instructions.

16. An apparatus for performing an operability test on a communications system device, the apparatus comprising:

means for providing a set of output test data;

means for generating an output signal with the communications system device in response to the set of output test data;

means for generating a reflected signal in response to the output signal;

wherein the reflected signal comprises a set of information signals each of which comprises a signal that is essentially the same as the output signal; and wherein each information signal is centered about a frequency that is essentially equal to a harmonic of a sample frequency plus or minus the center frequency of the output signal; and means for providing the reflected signal as a second input signal to the communications system device.

17. The apparatus of claim 16, further comprising:

means for generating a plurality of sets of input test data in response to the second input signal, wherein each of the sets of input test data corresponds to a particular information signal; and means for comparing at least one set of input test data with the set of output test data.

18. The apparatus of claim 17, further comprising means for comparing at least one set of input test data to at least one other set of input test data.

* * * * *